US012562052B2

(12) United States Patent
Shi et al.

(10) Patent No.: US 12,562,052 B2
(45) Date of Patent: Feb. 24, 2026

(54) INFORMATION PROCESSING DEVICE

(71) Applicant: TOYOTA JIDOSHA KABUSHIKI KAISHA, Toyota (JP)

(72) Inventors: Zhenqin Shi, Tokyo (JP); Yusuke Yamaura, Tokyo (JP); Shintaro Fukushima, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 18/779,253

(22) Filed: Jul. 22, 2024

(65) Prior Publication Data

US 2025/0140105 A1 May 1, 2025

(30) Foreign Application Priority Data

Oct. 31, 2023 (JP) ................................ 2023-186755

(51) Int. Cl.
*G08G 1/01* (2006.01)
*G08G 1/04* (2006.01)

(52) U.S. Cl.
CPC ......... *G08G 1/0125* (2013.01); *G08G 1/0112* (2013.01); *G08G 1/04* (2013.01)

(58) Field of Classification Search
CPC ....... G08G 1/0125; G08G 1/0112; G08G 1/04
See application file for complete search history.

(56) References Cited

U.S. PATENT DOCUMENTS

2022/0223038 A1 * 7/2022 Chikamori ....... G08G 1/096775

FOREIGN PATENT DOCUMENTS

DE 102021204925 A1 * 11/2022 ............. H04W 4/46
JP 2022-108034 A 7/2022

OTHER PUBLICATIONS

English Machine Translation DE-102021204925-A1 (Year: 2022).*

* cited by examiner

*Primary Examiner* — Andrew J Cromer
(74) *Attorney, Agent, or Firm* — SoraIP, Inc.

(57) ABSTRACT

An information processing device executes the followings: determining a first section in which a traffic jam is occurring based on first travel data; performing a first detection process based on a first image captured by a vehicle positioned around the first section, the first detection process being a process of detecting an end portion of the first section; when an end portion of the first section is detected, acquiring second travel data from a plurality of vehicles positioned outside the first section, and determining based on the second travel data whether there is a second section outside the first section, the second section being a section in which a series of traffic jam is occurring together with the first section; when it is determined that there is a second section, detecting an end portion of the second section; and presenting traffic jam information to a user.

5 Claims, 5 Drawing Sheets

INFORMATION PROCESSING DEVICE

CROSS-REFERENCE TO RELATED APPLICATION

This application claims priority to Japanese Patent Application No. 2023-186755 filed on Oct. 31, 2023, incorporated herein by reference in its entirety.

BACKGROUND

1. Technical Field

The present disclosure relates to detection of a traffic jam.

2. Description of Related Art

There are known many techniques of detecting a traffic jam occurring on a road on which vehicle travel. In this regard, Japanese Unexamined Patent Application Publication No. 2022-108034 (JP 2022-108034 A), for example, discloses a vehicle control system or the like that controls travel of a vehicle so as to avoid a traffic jam in a specific lane based on traffic jam information generated based on a condition for the occurrence of a traffic jam in the specific lane, acquired from probe information.

SUMMARY

An object of the present disclosure is to detect a traffic jam with higher accuracy than in the related art.

An aspect of an embodiment of the present disclosure provides an information processing device that detects a traffic jam on a road on which a plurality of vehicles travel, the information processing device including a control unit configured to: determine a first section in which the traffic jam is occurring on the road based on first travel data that are travel data on the vehicles;

- perform a first detection process based on a first image captured by a vehicle positioned around the first section, the first detection process being a process of detecting an end portion of the first section;
- when an end portion of the first section is detected, acquire second travel data from a plurality of vehicles positioned outside the first section, and determine based on the second travel data whether there is a second section outside the first section, the second section being a section in which a traffic jam is occurring that is estimated to form a series of the traffic jam together with the first section;
- when it is determined that there is a second section, perform a second detection process of detecting an end portion of the second section based on a second image captured by a vehicle positioned around the second section; and present information about the traffic jam to a user based on a position of an end portion of the traffic jam detected in the first detection process or the second detection process.

The present disclosure also provides, as other aspects, a method executed by the above device, a program for causing a computer to execute the method, and a computer-readable storage medium storing the program in a non-transitory manner.

According to the present disclosure, it is possible to detect a traffic jam with higher accuracy than in the related art.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
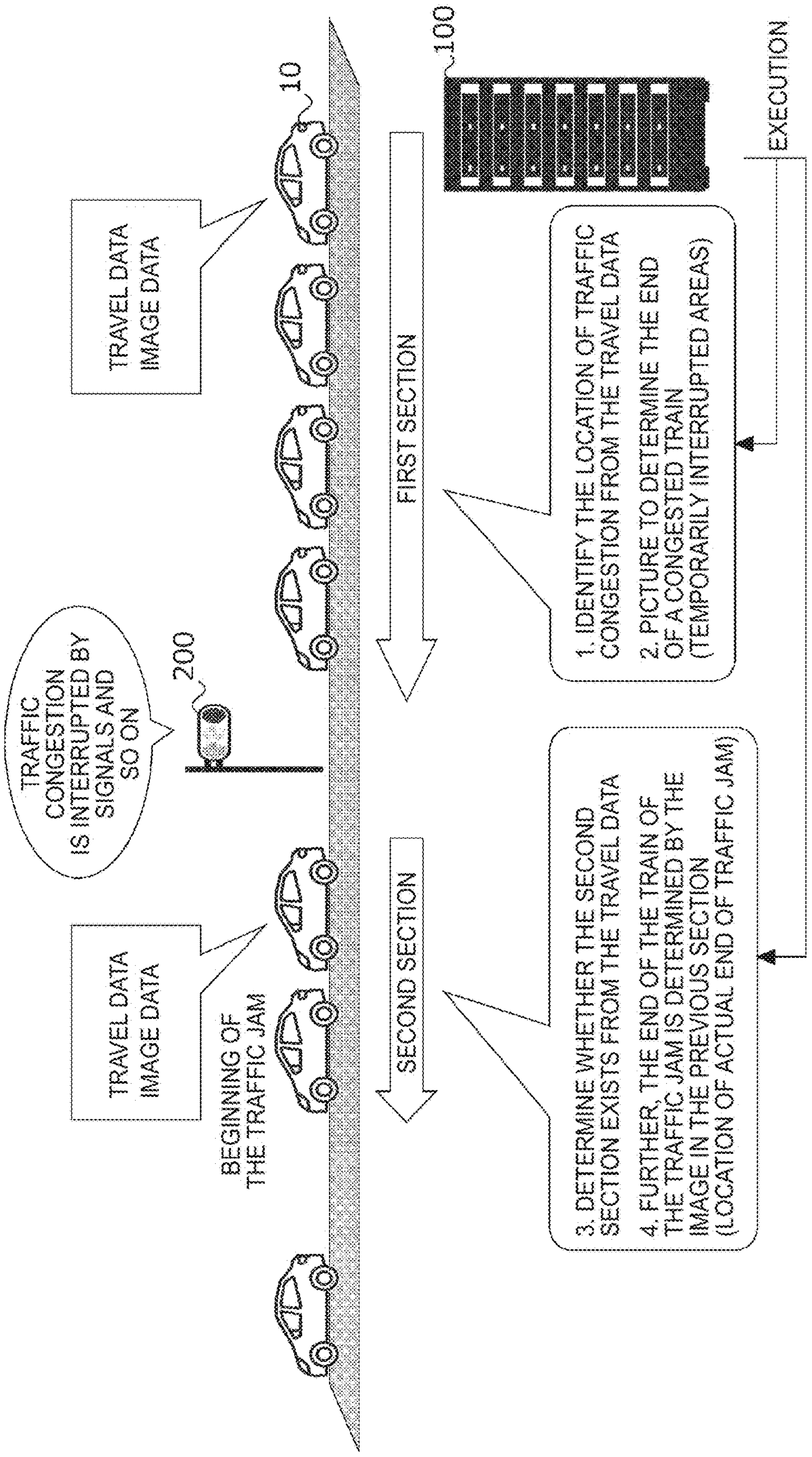
FIG. 1 is a diagram illustrating an outline of processing executed by a server device according to a first embodiment.

A traffic jam detection device for detecting a traffic jam is known.

For example, consider the case where the leading position of the train in the traffic jam is fixed, or the case where the vehicle of the train in the traffic jam is completely stopped. The congestion detection device is configured to be capable of acquiring probe data from a vehicle, and can determine a congestion section based on the probe data. For example, the traffic jam detection device specifies the position of the last position of the train based on data indicating the vehicle speed. Then, an image of the in-vehicle camera is acquired from the vehicle located at the tail end, and it is determined that the train is connected to the front side based on the image. By repeating this process from the vehicle located behind the traffic jam to the vehicle located in front of the traffic jam, it is possible to identify the leading position of the traffic jam. In addition, this makes it possible to grasp the entire train of the traffic jam.

However, the traffic jam to be detected may not be completely stopped, and the vehicle may be traveling at a very low speed. Further, in a case where the vehicle is traveling at a very low speed, the leading position of the train in the traffic jam is not always fixed, and the train in the traffic jam is not always continuous. For example, there is a portion where a traffic jam train is partially interrupted by a signal or the like. Alternatively, it is also conceivable that a traffic jam train continues, including a portion where the inter-vehicle distance is partially available. In the conventional method, it is assumed that the leading position of the train in the traffic jam is fixed or that the train in the traffic jam is continuous, and therefore it is difficult to accurately detect the leading position of the traffic jam in which the vehicle is traveling at a very low speed. In order to deal with such a problem, it is preferable to determine whether or not there is a train that can be regarded as a series of congestion before the detection processing is ended when it is determined that the train of the congestion has been temporarily interrupted. In addition, when a series of trains that can be regarded as a traffic jam continues, it is preferable to continue the process of detecting the head of the traffic jam. An information processing device according to the present disclosure solves such a problem.

An information processing device according to an aspect of the present disclosure is an information processing device that detects a traffic jam on a road on which a plurality of vehicles travel. A control unit is provided to execute the followings: determining a 1 section in which the traffic jam has occurred on the road based on 1 travel data which is travel data of the plurality of vehicles; a 1 detection process which is a process for detecting an end part of the 1 section is performed on the basis of a 1 image captured by a vehicle located around the 1 section; when an end part of the 1 section is detected, a 2 travel data is acquired from a plurality of vehicles located outside the 1 section, and a 2 section in which a traffic jam which can be evaluated as being the 1 section and a series of the traffic jam is generated outside the 1 section is determined on the basis of the 2 travel data, and when it is determined that there is a 2 section, a 2 image captured by a vehicle located around the 2 section based on, performing a second detection process of detecting an end portion of the second section, and presenting the information about the congestion to the user based on the position of the end portion of the congestion detected by the first detection process or the second detection process.

The first travel data is data related to traveling acquired from a plurality of vehicles traveling on a road, and is typically data including speed information and the like.

The first section is a section in which the control unit first determines that a traffic jam has occurred based on the first travel data (for example, speed information). The first section may typically be a section up to a place where it is determined that the train is interrupted (for example, a place where the inter-vehicle distance between the vehicles is opened by a predetermined value or more).

The first image is image data captured by a vehicle included in the first section or a vehicle located near an end of the first section. The first image may be captured by a vehicle in a train of congestion or by another vehicle (e.g., a vehicle traveling in a lane that is not congested). The first image is preferably an image capable of determining the distance between vehicles and the like.

The first detection process is a process of detecting an end portion of the first section performed by the control unit based on the first image. The first detection process may be a process of determining an end portion (for example, a head of a train) of a train in a traffic jam by determining an inter-vehicle distance between one vehicle and a vehicle in front of the vehicle based on the first image.

The second travel data is data related to travel of the vehicle acquired from a plurality of vehicles located outside the first section. The second travel data may include, for example, speed information of the vehicle and data such as an inter-vehicle distance with respect to the front vehicle.

The second section is a section of a traffic jam train located outside the first section. The second section is typically a section of a further congested train at the end of the first section (e.g., forward if the end is the head).

The second image is image data captured by the vehicle located around the edge of the second section or the second section. Similarly to the first image, the second image may be captured by a vehicle in a train in a traffic jam, or may be captured by another vehicle. The second image is preferably an image capable of determining the distance between vehicles and the like.

The second detection process is a process of detecting an end portion of the second section performed by the control unit based on the second image. The second detection process may be a process of determining an end portion of a traffic jam train by determining an inter-vehicle distance between one vehicle and a vehicle in front of the vehicle based on the second image.

The control unit executes a process (first detection process) of determining an end portion of a traffic jam train based on an image captured by the vehicle. Thereafter, based on the travel data (second travel data) generated outside (forward or rearward) the end portion of the train of the determined congestion, it is determined whether or not the detection of the end portion of the train of the congestion is further continued outside the determined end portion.

For example, in a case where it is determined that "there is a second section in which a traffic jam that can be evaluated as a series of traffic jams with the first section is occurring outside the first section" based on the second travel data, a process (second detection process) of detecting an end portion of the train based on the image is performed on the second section.

According to such a configuration, even when the train in the traffic jam continues to be partially interrupted, the end portion of the traffic jam can be accurately determined.

The control unit may determine that the second section is present when an average speed of the plurality of vehicles located outside the first section is equal to or less than a first threshold value.

This is because, when the average speed of the plurality of vehicles located outside the first section is equal to or less than a predetermined threshold value, it can be estimated that a congestion continuous with the first section occurs outside the first section.

The second section may be a distance within a second threshold from an end of the first section. This is because it is not appropriate to evaluate a series of congestion when the group of vehicles outside the first section is too far from the first section.

The control unit may determine to perform the second detection process when the road includes a plurality of lanes and a ratio of the number of vehicles present in at least one of the plurality of lanes to the number of vehicles present in another of the lanes is equal to or greater than a third threshold value.

That is, the second detection process may be performed when the number of vehicles present in one lane is large with respect to other lanes. According to such a configuration, in a case where only one lane of the plurality of lanes is congested, the end portion of the congestion can be detected more accurately.

Further, the control unit, when it is determined that there is the second section, if the situation of the plurality of vehicles on the road is not suitable for the detection of the end of the congestion by an image, the third detection process for detecting the end of the second section based on the third travel data acquired from the plurality of vehicles located outside the first section is performed, the situation of the plurality of vehicles on the road is suitable for the detection of the end of the congestion by an image, the second detection process may be performed.

Detection of the end portion of the traffic jam can be performed based on an image, but depending on the road environment and the situation of the vehicle (for example, in a case where the forward visibility is poor), detection using the image may not be suitable. In such a case, the end portion of the second section may be detected based on the travel data.

According to this configuration, even when it is difficult to detect the end portion of the train with the traffic jam by the image, the end portion of the train with the traffic jam can be detected accurately to a certain degree.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

First Embodiment

An outline of processing performed by the server device according to the first embodiment will be described with reference to FIG. 1. FIG. 1 is a diagram illustrating an outline of processing executed by a server device 100 according to a first embodiment. Here, the server device 100 is an example of an information processing device according to the present disclosure. The server device 100 acquires the image data and the travel data from the vehicle 10, and determines the end portion of the traffic jam train. In addition, information on traffic congestion is provided for a given vehicle based on the judged congestion. The server device 100 is configured to be able to communicate with the vehicle 10.

First, the server device 100 communicates with the vehicle 10 and acquires travel data from the vehicle 10. The travel data is data related to the travel of the vehicle 10 sensed by the vehicle 10. The travel data may include, for example, speed information of the vehicle 10.

Next, the server device 100 identifies a section in which a traffic jam is occurring on the road based on the acquired travel data. For example, the server device 100 may specify a section in which the average vehicle speeds of the plurality of vehicles 10 are equal to or lower than a predetermined value as a section in which a traffic jam has occurred. The section identified here is referred to as a first section. The first section is a section in which a train in a traffic jam continues at a time until the traffic jam is temporarily interrupted by a signal or the like.

Next, the server device 100 acquires image data captured by the in-vehicle camera from the vehicle included in the first section or the vehicle existing in the vicinity of the end portion of the first section. Then, the server device 100 determines the end portion of the first section based on the acquired image data. As a result, it is possible to more accurately determine the end portion of the train in the traffic jam as compared with the case where the section in which the traffic jam is occurring is determined based on only the travel data.

Subsequently, the server device 100 determines, based on the travel data acquired from the vehicle 10 located earlier than the first section, whether or not there is a section (second section) in which a congestion that can be evaluated as a series of congestion with the first section exists in a section ahead of the end portion of the first section. For example, the server device 100 may determine that the second section exists when the average value of the vehicle speeds acquired from the plurality of vehicles 10 located earlier than the first section is equal to or smaller than the predetermined value. This is because there is a possibility that the traffic jam is still continuing even at a place where the traffic jam is once interrupted by a signal or the like.

When determining that the second section exists, the server device 100 acquires image data captured by the in-vehicle camera mounted on the vehicle 10 located in the vicinity of the second section. Then, the server device 100 determines the end portion of the second section based on the acquired image data.

That is, the server device 100 detects the end portion of the traffic jam train by using the travel data and the image data, and then performs the determination process of whether to further continue the detection of the end portion of the traffic jam train by using the travel data acquired by the vehicle located outward, thereby dynamically expanding the target range of the detection of the traffic jam.

As described above, the server device 100 according to the present embodiment repeats the process of detecting the end portion of the traffic jam by using the travel data and the image data in combination. This makes it possible to accurately determine the end portion of the traffic jam even when the traffic jam train continues to be partially interrupted.

Figure 2:
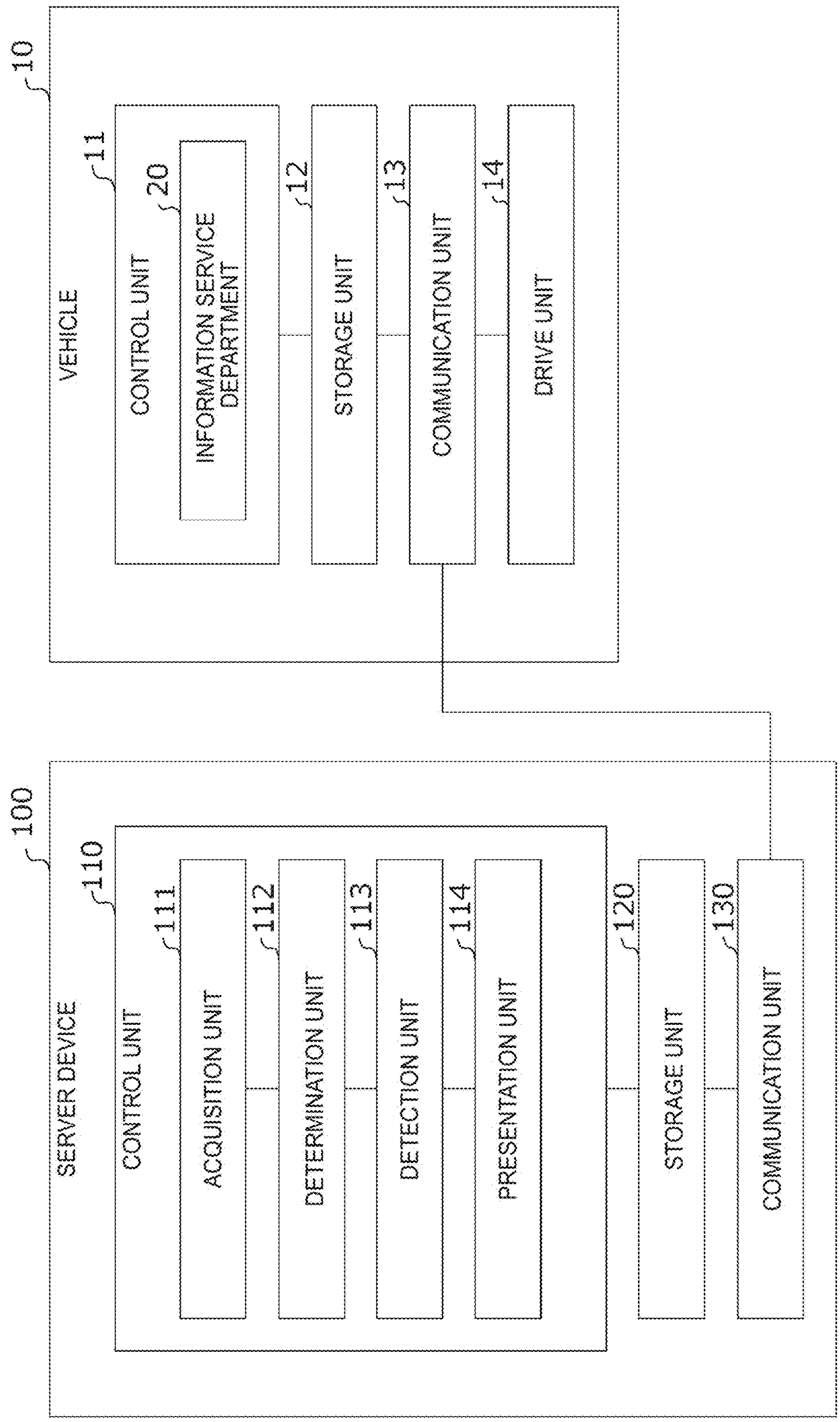
FIG. 2 is a diagram illustrating components of a system including a server device according to the first embodiment.

Next, each element constituting the system will be described in detail. FIG. 2 is a diagram illustrating components of a system including the server device 100 according to the first embodiment.

The server device 100 according to the present embodiment includes a control unit 110, a storage unit 120, and a communication unit 130. The server device 100 is configured to be able to communicate with the vehicle 10.

The control unit 110 is implemented by a processor such as a Central Processing Unit (CPU) or a Graphics Processing Unit (GPU) and a memory. The control unit 110 includes an acquisition unit 111, a determination unit 112, a detection unit 113, and a presentation unit 114 as functional modules. These functional modules may be realized by executing a program by the control unit 110.

The acquisition unit 111 acquires the first travel data including the speed information from the plurality of vehicles 10 traveling on the road to be detected as the traffic jam. Further, the acquisition unit 111 acquires image data captured by the in-vehicle camera mounted on the vehicle 10 from the vehicle 10 in the first section and the vehicle 10 existing in the vicinity of the end of the first section.

Further, the acquisition unit 111 acquires second travel data including data such as speed information and inter-vehicle distance information from a plurality of vehicles 10 traveling in a section following the first section. Further, the acquisition unit 111 acquires image data captured by the in-vehicle camera mounted on the vehicle 10 from the vehicle 10 existing in the vicinity of the end portions of the vehicle 10 and the second section in the second section.

Based on the first travel data, the determination unit 112 determines that there is a first section that is a section in which a traffic jam has occurred. The first section determined by the determination unit 112 is based only on the first travel data (for example, the vehicle speed), and therefore is not necessarily accurate. The end portion of the first section is determined by a first detection process to be described later.

Further, the determination unit 112 determines, based on the second travel data, whether or not there is a second section that is a section in which a traffic jam that can be evaluated as a series of traffic jams with the first section exists in front of or behind the first section.

The detection unit 113 performs a first detection process, which is a process of detecting an end portion of the first section, based on the first image. Typically, the detection unit 113 may determine the inter-vehicle distances of the plurality of vehicles included in the first section from the first image, and determine the position of the vehicle in which the inter-vehicle distance with the vehicle ahead is equal to or greater than a predetermined value as the end of the first section.

Further, the detection unit 113 performs a second detection process, which is a process of detecting an end portion of the second section, based on the second image. Typically, the detection unit 113 may determine the inter-vehicle distances of the plurality of vehicles included in the second section from the second image, and determine the position of the vehicle in which the inter-vehicle distance with the vehicle ahead is equal to or greater than a predetermined value as the end of the second section.

The presentation unit 114 presents information related to the congestion to the user. The presentation unit 114 may present information indicating the congestion section to the user based on the position of the end portion of the train of the congestion detected in the first detection process or the second detection process. For example, the presentation unit 114 may display the information on the display unit of the terminal associated with the user.

The storage unit 120 is an auxiliary storage device such as a main storage device such as a RAM or a ROM, an EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 120 stores data or the like used or generated in processing performed by the control unit 110. Further, the storage unit 120 may temporarily store the first travel data, the second travel data, the first image, and the second image acquired from the vehicle 10.

The communication unit 130 includes a communication circuit that performs wireless communication. The communication unit 130 may be, for example, a communication circuit that performs wireless communication using 4th Generation (4G) or a communication circuit that performs wireless communication using 5th Generation (5G). The communication unit 130 may be a communication circuit that performs radio communication using Long Term Evolution (LTE) or a communication circuit that performs communication using Low Power Wide Area (LPWA). Further, the communication unit 130 may be a communication circuit that performs radio communication using Wi-Fi (registered trademark).

Next, a device other than the server device 100 will be described.

The vehicle 10 is a vehicle such as a passenger car. The vehicle 10 may be a truck, a bus, or the like. The vehicle 10 includes a control unit 11, a storage unit 12, a communication unit 13, and a drive unit 14. The vehicle 10 periodically transmits travel data to the server device 100 or an image captured by an in-vehicle camera mounted on the vehicle 10. Alternatively, the vehicle 10 may transmit the travel data or the image data to the server device 100 when a request is received from the server device 100. The vehicle 10 is configured to be able to communicate with the server device 100.

The control unit 11 controls Electronic Control Unit (ECU) and the like mounted on the vehicles 10. The control unit 11 is implemented by a processor such as a CPU or a GPU and memories. The control unit 11 includes an information providing unit 20 as a software module. The control unit 11 may control the storage unit 12, the communication unit 13, and the drive unit 14 by executing a program.

The information providing unit 20 transmits the travel data of the vehicle 10 and the image data captured by the in-vehicle camera mounted on the vehicle 10 to the server device 100 via the communication unit 13, which will be described later. The information providing unit 20 may periodically transmit the data to the server device 100, or may transmit the data to the server device 100 when a request is received from the server device 100.

The storage unit 12 is an auxiliary storage device such as a main storage device such as a RAM or a ROM, a EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 11. However, some or all of the functions may be implemented by a hardware circuit such as an ASIC or an FPGA.

The storage unit 12 stores data or the like used or generated in the processing performed by the control unit 11. The storage unit 12 may store travel data generated by ECU, image data captured by the in-vehicle camera, and the like.

The communication unit 13 includes a communication circuit that performs wireless communication. The communication unit 13 may be, for example, a communication circuit that performs wireless communication using a 4G or a communication circuit that performs wireless communication using a 5G. The communication unit 13 may be a communication circuit that performs radio communication using an LTE, or may be a communication circuit that performs communication using an LPWA. Further, the communication unit 13 may be a communication circuit that performs radio communication using Wi-Fi (registered trademark).

The drive unit 14 is a means for causing the vehicle 10 to travel. The drive unit 14 may include, for example, a motor, an inverter, a brake, and a steering mechanism for driving wheels. The drive unit 14 may be operated by electric power supplied from a battery.

Figure 3:
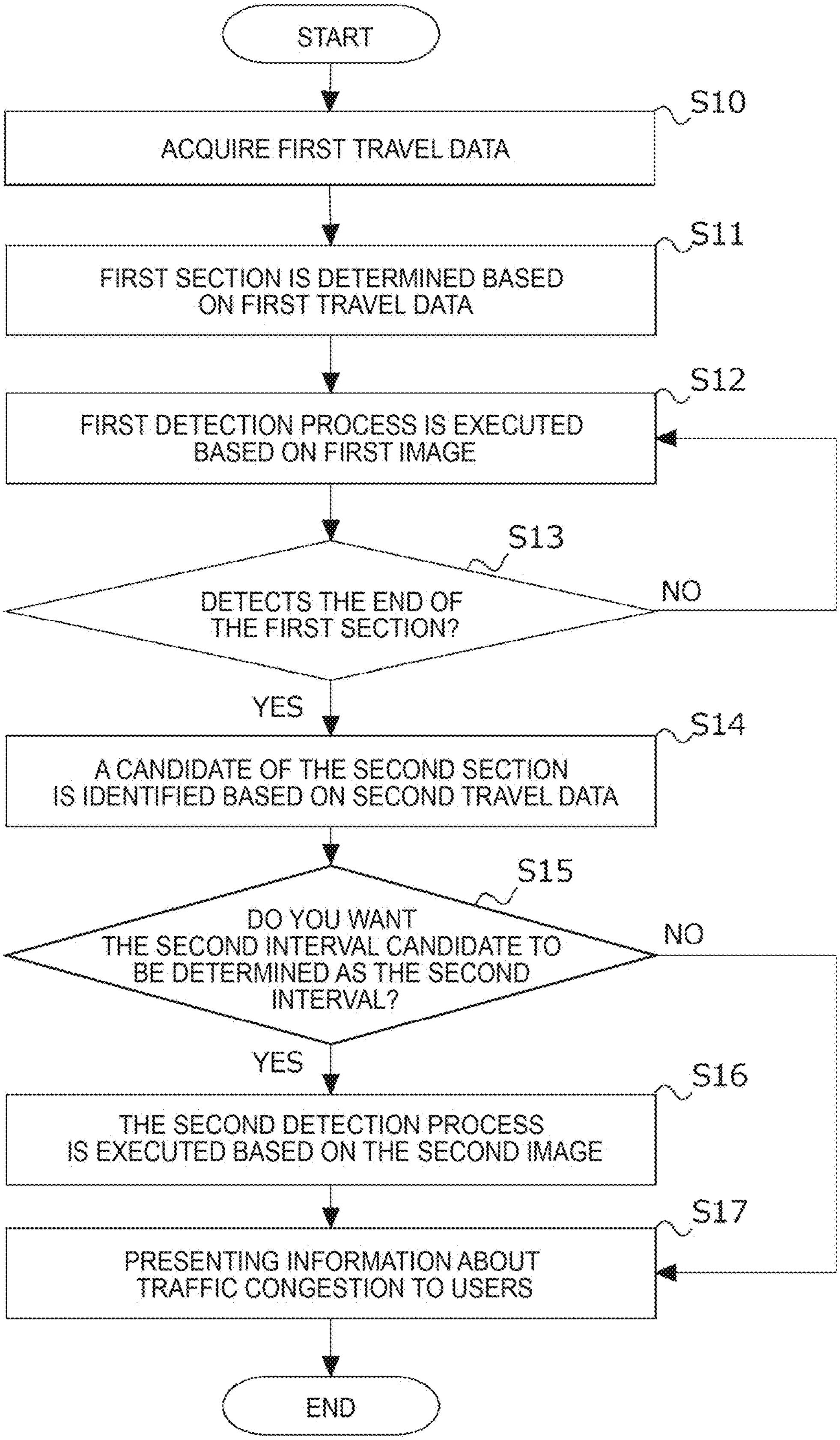
FIG. 3 is a flowchart of processing executed by a control unit of the server device according to the first embodiment.

Next, specific contents of the processing performed by the server device 100 will be described. FIG. 3 is a flowchart of processing executed by the control unit 110 of the server device 100 according to the first embodiment.

For example, the server device 100 may start the processing illustrated in FIG. 3 when the vehicle that is the destination of the congestion information starts traveling. Alternatively, the server device 100 may start the processing illustrated in FIG. 3 when a trigger is received from a terminal associated with a user who is a provider of the congestion information.

First, in S10, the acquisition unit 111 acquires the first travel data from a plurality of vehicles 10 traveling on a road to be detected as a traffic jam. The acquisition unit 111 communicates with the plurality of managed vehicles 10 via the communication unit 130, and acquires first travel data including the vehicle speed and the like of the vehicle 10.

Next, in S11, the determination unit 112 determines the first section based on the first travel data. Specifically, the determination unit 112 determines that a section in which the vehicle speeds of the plurality of vehicles 10 are equal to or lower than a predetermined value is a section (first section) in which a traffic jam is occurring. The first section is a section roughly determined based on only the travel data (vehicle speed).

The determination unit 112 may estimate that a traffic jam has occurred only in some lanes based on the travel data received from the plurality of vehicles 10.

For example, a case where a traffic situation in the vicinity of an exit of an expressway is detected is considered. By using the travel data of the plurality of vehicles 10, the determination unit 112 can determine that only the vehicle 10 that wants to descend from the expressway near the exit forms a train on the outflow path, and that a traffic situation occurs in which the other vehicles 10 continue to travel at high speed on the main line. Alternatively, the traffic congestion occurring in the exit lane of the expressway can be extended to the main line, and it can be determined that a traffic situation in which the traffic congestion is occurring in a part of the lanes on the main line is occurring.

In addition, the determination unit 112 can determine not only that a traffic situation occurs in which only a part of lanes of the expressway is congested, such as an exit congestion, but also that a traffic situation occurs in which a vehicle traveling in all lanes travels at a low speed due to the exit congestion. Therefore, the server device 100 can include the traffic situation for each lane of the expressway, which is difficult to determine by the conventional method, in the information to be provided.

Next, in S12, the detection unit 113 executes the first detection process based on the first images. In this step, the detection unit 113 may instruct the acquisition unit 111 to cause the acquisition unit 111 to acquire the first image from the vehicle located around the first section. In addition, when the acquisition unit 111 periodically acquires the first image, the detection unit 113 may read the acquired first image from the storage unit 120.

Typically, the detection unit 113 determines the inter-vehicle distances of the plurality of vehicles located in the first section from the first image. Then, the detection unit 113 determines, from the first image, the position of the vehicle that can be evaluated as the inter-vehicle distance to the vehicle ahead becoming equal to or greater than a predetermined value as the end portion of the first section.

In the first detection processing, not only an image captured by the in-vehicle camera but also an image captured by a camera (roadside camera) installed on the roadside side may be used. The acquisition unit 111 acquires image data from the vehicle 10, the roadside camera, or the like at a timing when it is determined that the first detection process is executed. Note that the acquisition unit 111 may acquire the image data from the vehicle 10 selected to be present in the vicinity of the end of the train in the traffic jam in the first section.

The image acquired from the vehicle 10, the roadside camera, or the like may be an image acquired in real time by the acquisition unit 111 in accordance with the detection process by the detection unit 113, or may be an image accumulated in the past. In addition, the detection unit 113 may also use information statistically obtained from past images using images accumulated in the past. As a result, it is possible to efficiently grasp a place where traffic congestion is likely to occur at a place where traffic congestion is likely to occur.

In the first detection process, a YOLO that is a technique for detecting an object, a SLAM that is a technique for estimating a self-position of vehicles, or the like may be used.

Next, in S13, the determination unit 112 determines whether or not the detection unit 113 has detected an end portion of the first section. In this step, when the determination unit 112 determines that the detection unit 113 has detected the end portion of the first section, an affirmative determination is made.

If an affirmative determination is made in this step, the process transitions to S14.

If a negative determination is made in this step, the process returns to S12.

When the process transitions to S14, the determination unit 112 identifies candidates for the second section based on the second travel data. The determination unit 112 performs the above-described identification based on the second travel data acquired from the plurality of vehicles located outside the first section by the acquisition unit 111. Specifically, the determination unit 112 determines that a section in which the average speed of the plurality of vehicles 10 is equal to or lower than a predetermined threshold is a candidate of a second section that is a section in which a congestion that can be evaluated as a series of congestion with the first section existing in front of or behind the first section is occurring. If a section in which a congestion that can be evaluated as a series of congestion with the first section does not occur before or after the first section, it is determined that there is no second section.

Here, a process (S14) in which the determination unit 112 of the control unit 110 of the server device 100 determines the presence or absence of candidates in the second section will be described.

First, the determination unit 112 determines whether or not the average speed of the vehicle 10 located outward (that is, forward or backward) of the first section is equal to or less than the first threshold value. The determination unit 112 calculates the average speed of the plurality of vehicles 10 from the vehicle speeds of the plurality of vehicles 10 existing near the end of the first section acquired by the acquisition unit 111, and determines whether or not the average speed is equal to or less than the first threshold value. When the determination unit 112 determines that the average speed of the vehicle 10 located outside the first section is equal to or less than the first threshold value, it determines that there is a candidate of the second section outside the first section. That is, the determination unit 112 determines that the section preceding the position determined as the end portion of the first section and continuing with the first section is a candidate of the second section, which is a section continuing with congestion. For example, the mean velocity thresholds may be 20 km/h. When the determination unit 112 determines that the average speed of the vehicle 10 located outside the first section is not equal to or less than the first threshold value, the determination unit 112 determines that there is no candidate for the second section outside the first section. That is, the determination unit 112 determines that the congestion does not continue in a section that is a section ahead of the position determined as the end portion of the first section and that is subsequent to the first section.

As a result, the server device 100 can determine a section that is a section ahead of the first section and in which the average of the vehicle speeds of the traveling vehicles 10 is lower than a predetermined threshold as a candidate of a section in which the traffic jam continues. Therefore, the server device 100 can detect a traffic jam even in a traffic jam in which the vehicle is not completely stopped.

Next, in S15, the determination unit 112 determines whether or not the second section candidates determined by S14 are to be determined as the second section. In this step, when the inter-vehicle distance between the vehicle located at the end of the candidate of the second section and the vehicle located at the end of the first section is equal to or smaller than the second threshold value, the determination unit 112 determines the candidate of the second section as the second section. Here, the second thresholds may be numerical values ranging from 3 m to 5 m.

That is, the determination unit 112 determines that there is a second section that is congested with the first section when the average speed of the vehicle group existing outside the first section is equal to or less than the first threshold value and the distance between the vehicle group and the vehicle group is equal to or less than the second threshold value.

If an affirmative determination is made in this step, the process transitions to S16.

If a negative determination is made in this step, the process transitions to S17.

When the process transitions to S16, the detection unit 113 executes the second detection process based on the second images. In this step, the detection unit 113 may instruct the acquisition unit 111 to cause the acquisition unit 111 to acquire the second image from the vehicle located around the second section. In addition, when the acquisition unit 111 periodically acquires the second image, the detection unit 113 may read the already acquired second image from the storage unit 120.

The detection unit 113 typically determines the inter-vehicle distances of the plurality of vehicles 10 in the second section based on the second image. Then, the detection unit 113 determines the position of the vehicle 10 in which the vehicle-to-vehicle distance to the vehicle 10 in front becomes a predetermined value or more, the end of the second section. The detection unit 113 performs the second detection process on the basis of the second image, which is the image data captured by the in-vehicle camera of the vehicle 10, acquired by the acquisition unit 111 from the information providing unit 20 of the vehicle 10. The process then transitions to S17.

When the process transitions to S17, the presentation unit 114 presents the information on the congestion to the user who is the provision destination of the congestion information. Presentation 114, for example, the display unit of the terminal associated with the user may display information about the traffic congestion generated based on the position of the end of the congestion train detected by the detection unit 113.

As described above, the server device 100 according to the present embodiment once determines the end portion of the train in the traffic jam, and then determines whether or not to continue detecting the end portion of the train in the traffic jam in the further previous section based on the travel data of the vehicle 10 located outside the end portion. Then, in a case where the train in the traffic jam continues to the previous section, the server device 100 continues the process of detecting the end of the train in order to track the position of the head of the train in the actual traffic jam. That is, the server device 100 can accurately detect the position of the end portion of the traffic jam even in a case where the traffic jam train is once interrupted and still continues. Therefore, the server device 100 can detect a traffic jam more accurately than in the related art.

Second Embodiment

In the first embodiment, the determination unit 112 determines the presence or absence of the second section based on the average speed of the plurality of vehicles 10 existing outside the first section and the distance between the vehicle groups. However, there are various factors that cause the average speed of the plurality of vehicles 10 to be equal to or less than a predetermined value or cause the inter-vehicle distance to be equal to or less than a predetermined distance. It is preferable that the server device 100 determines the presence or absence of the second section in consideration of factors that cause the average speed of the plurality of vehicles 10 to be equal to or less than a predetermined value or cause the inter-vehicle distance to be equal to or less than a predetermined distance. Therefore, in the second embodiment, when determining the presence or absence of the second section, a process of analyzing the reason why the distance between the first section and the second section is open is further executed.

Figure 4:
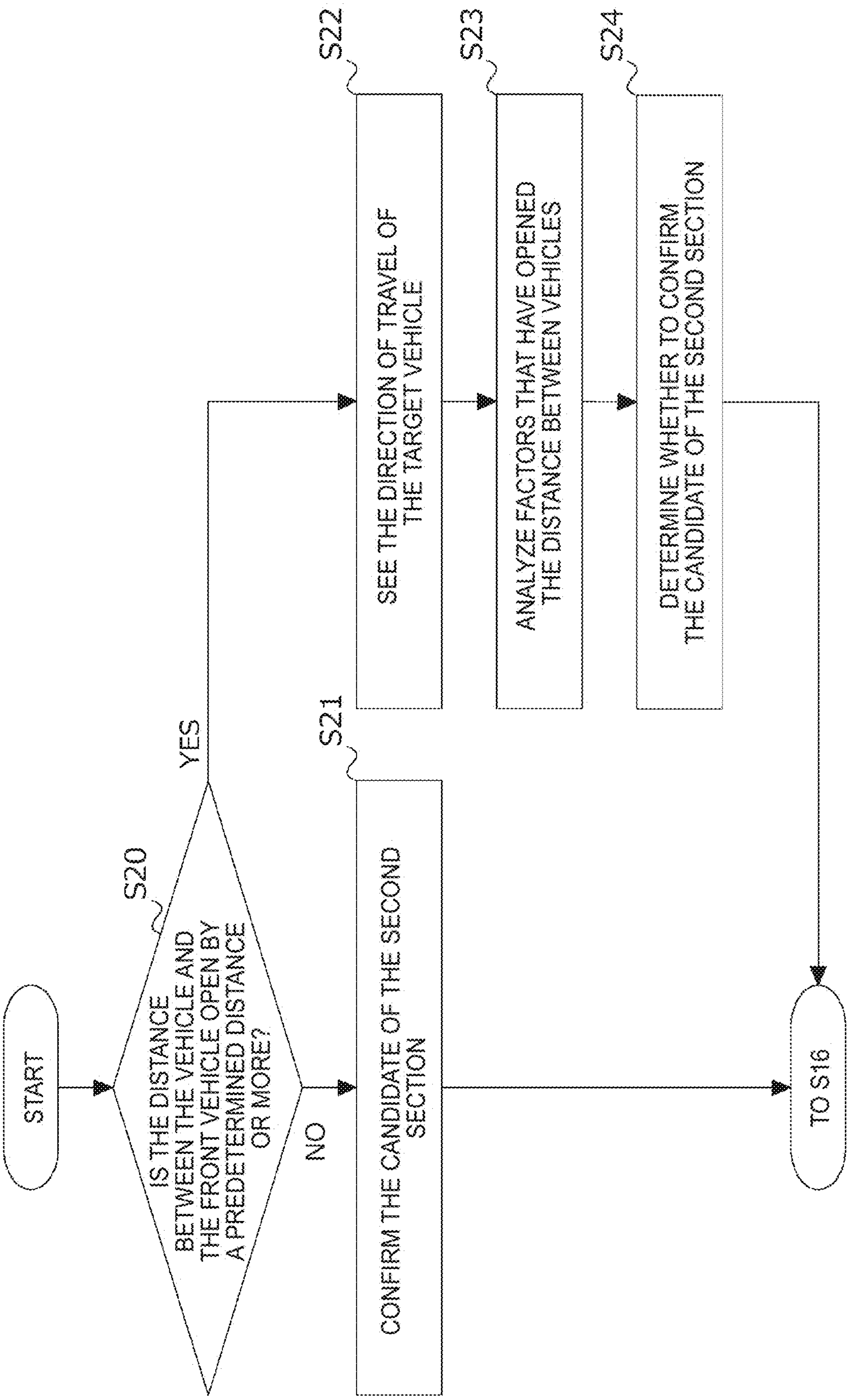
FIG. 4 is a flow chart of a process executed by a control unit of the server device according to a second embodiment.

FIG. 4 is a flowchart of processing executed by the control unit 110 of the server device 100 according to the second embodiment. The processing illustrated in FIG. 4 is a detailed description of processing performed by S15.

First, in S20, the determination unit 112 determines whether or not the inter-vehicle distance between the vehicle 10 located at the end of the first section (referred to herein as the target vehicle) and the vehicle ahead of the vehicle 10 is opened by a predetermined distance or more. Instead of the above-described processing, the determination unit 112 may perform the above-described determination based on the second travel data acquired by the acquisition unit 111. When the determination unit 112 determines that the inter-vehicle distance between the vehicle 10 determined to be the end portion of the first section and the vehicle ahead of the vehicle 10 is opened by a predetermined distance or more, the present step is an affirmative determination.

If an affirmative determination is made in this step, the process transitions to S22.

If a negative determination is made in this step, the process transitions to S21.

When the process transitions to S21, the determination unit 112 determines the forward or backward section of the first section as the second section. The process then transitions to S16.

When the process transitions to S22, it means that the distance from the end of the first section to the candidates of the second section is opened by a predetermined distance or more. In this case, it is preferable to analyze the cause of the open distance and determine whether or not the section in which the previous vehicle group is located is to be treated as the second section.

In S22, the determination unit 112 specifies a direction in which the target vehicles are expected to travel. This is because the traffic situation in the direction can be grasped by specifying the direction in which the target vehicle travels. For example, in a case where the target vehicle is stopping by leaving the left winker, it is expected that the target vehicle travels by turning left.

Next, in S23, the determination unit 112 analyzes a factor for which the inter-vehicle distance between the target vehicle and the vehicle in front of the target vehicle is open. For example, in a case where the target vehicle is stopped by leaving the left winker and there is a candidate of the second section in the left turn direction, the group of vehicles is interrupted due to the intersection, but it can be estimated that a series of congestion continues as a whole. In this case, it can be determined that the inter-vehicle distance between the target vehicle and the front vehicle is open due to the presence of the intersection.

Next, in S24, the determination unit 112 determines whether or not to confirm the candidates for the second section based on the result of the analysis in S23. For example, as described above, in a case where the traffic jam continues across the intersection, it is preferable that the candidate of the second section in the left turn direction is determined as the second section.

As described above, in the second embodiment, the server device 100 determines the presence or absence of the second section in consideration of the actual traffic situation. In the first embodiment, only the inter-vehicle distance is used in the determination of S15, but according to the second embodiment, the presence or absence of the second section can be determined more accurately.

Third Embodiment

In the first embodiment, the second section is determined based on the second travel data including the vehicle speed, and the end portion of the traffic jam train is detected based on the image data captured by the vehicle 10 located in the second section. However, in a case where only a part of lanes are congested and traffic of another lane is flowing on a road having a plurality of lanes, it is also conceivable to detect an end portion of a train of the congestion of the part of lanes by using image data captured by the vehicle 10 of the other lane. In such a case, by using an image captured by the vehicle 10 of another lane, there is a possibility that the end portion of the traffic jam of the part of the lane can be detected more accurately. Therefore, the second detection process may be executed only in a case where a one-side traffic jam in which only a part of lanes is congested occurs.

The third embodiment is an embodiment in which the server device 100 (the determination unit 112) executes the second detection process when the ratio of the number of vehicles present in one lane to the number of vehicles present in another lane is equal to or larger than the third threshold value.

Figure 5:
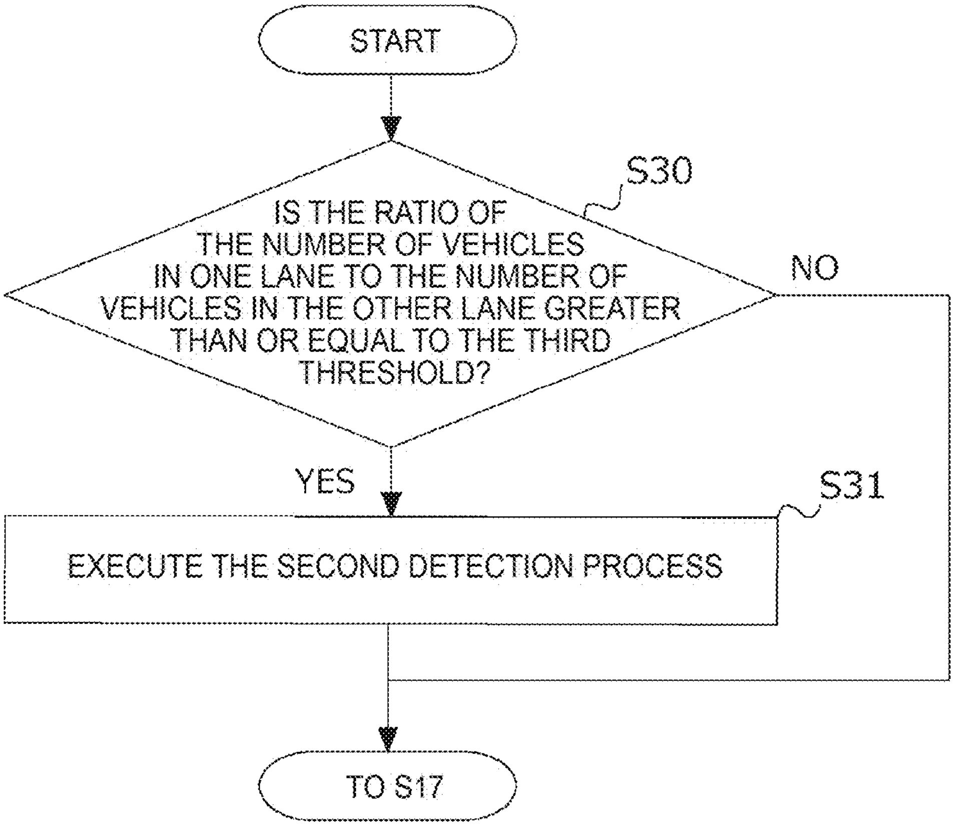
FIG. 5 is a flowchart of processing executed by a control unit of the server device according to a third embodiment.

FIG. 5 is a flowchart of processing for determining the second detection processing executed by the control unit 110 of the server device 100 according to the third embodiment. The process illustrated in FIG. 5 is executed in place of S16 illustrated in FIG. 3.

First, in S30, the determination unit 112 determines whether or not the ratio of the number of vehicles present in one lane to the number of vehicles present in another lane is equal to or greater than the third threshold. That is, the determination unit 112 determines whether or not a certain lane has a larger traffic amount than a predetermined amount as compared with other lanes. When the determination unit 112 determines that the ratio of the number of vehicles present in one lane to the number of vehicles present in another lane is equal to or greater than the third threshold value, the present step is an affirmative determination.

If an affirmative determination is made in this step, the process transitions to S31.

If a negative determination is made in this step, the process transitions to S32.

When the process transitions to S31, the detection unit 113 executes the second detection process. The detection unit 113 executes the second detection process using the image of the train of the one lane captured by the vehicle 10 traveling in the other lane.

If the process transitions to S32, the process transitions to S17. That is, the detection unit 113 does not execute the second detection process. The detection unit 113 does not execute the second detection process using the image of the train of the one lane captured by the vehicle 10 traveling in the other lane. Here, in S17, only the information about the first section is provided.

In the third embodiment, when only some lanes are congested, the server device 100 can capture a train of the congested lane from the vehicle 10 traveling in the non-congested lane. Thus, the end portion of the congestion section can be easily grasped. As described above, the server device 100 may perform the second detection process only when only a part of the lanes is congested.

Fourth Embodiment

In the first embodiment, the second embodiment, and the third embodiment, in order to detect the end portion of the second section, the second detection process is performed using an image. However, depending on the traffic situation of the road, a detection process using an image may not be suitable as a process for detecting the end portion of the traffic jam in the second section.

Therefore, the fourth embodiment is an embodiment in which, when a situation of a plurality of vehicles on a road is not suitable for detecting an end portion of a traffic jam by an image, the end portion of the traffic jam is detected by using the travel data instead of the image. It may be determined based on the travel data received from the vehicle 10 that the situation is not suitable for detecting the end of the traffic jam by the image. For example, in a case where the environment matches a predetermined condition, such as when a traffic jam occurs in a section with poor visibility or in a bad weather condition, the end portion of the traffic jam may be detected by using the travel data instead of the image.

In the present embodiment, the process of detecting the end portion of the traffic jam using the travel data is referred to as a third detection process. In the third detection process, the end portion of the second section is detected based on the third travel data acquired from the plurality of vehicles 10 located outside the first section. The third travel data includes the vehicle speed of the corresponding vehicle 10, the inter-vehicle distance from the front vehicle, and the like. For example, the detection unit 113 may determine, as the third detection process, the position of the vehicle 10 at the end of the section in which the average speed of the plurality of vehicles 10 to be detected is equal to or less than a predetermined threshold as the end of the train in the traffic jam.

Accordingly, the server device 100 can detect the end portion of the train in the traffic jam based on the vehicle speed or the like even when the situation of the vehicle 10 to be subjected to the detection processing of the end portion of the train in the traffic jam is not suitable for detecting the end portion of the train in the traffic jam based on the image.

Modified Examples

The above-described embodiment is merely an example, and the present disclosure may be appropriately modified and implemented without departing from the scope thereof.

For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

For example, the first travel data, the second travel data, and the third travel data may be processed by the server device 100, and the image data such as the first image or the second image may be distributed between the server device 100 and the one or more vehicles 10.

Further, in the above-described embodiment, the first detection process and the second detection process are performed based on the image, but the first detection process and the second detection process may be performed based on the inter-vehicle distance sensed by the vehicle 10 or the like.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. Non-transitory computer-readable storage media include, for example, any type of disk, such as a magnetic disk (floppy (registered trademark) disk, hard disk drive (HDD), etc.), an optical disk (such as a CD-ROM, DVD disk Blu-ray disk), read only memory (ROM), random access memory (RAM), EPROM, EEPROM, magnetic card, flash memory, optical card, any type of medium suitable for storing electronic instructions.

What is claimed is:

1. An information processing device, comprising:

a communication unit configured to receive, from a plurality of vehicles, travel data including vehicle speed information and image data captured by an in-vehicle camera mounted on each of the plurality of vehicles;

a storage unit configured to store the travel data including the vehicle speed information and the image data; and a control unit implemented by a processor and a memory, the control unit being configured to acquire first travel data from a plurality of vehicles traveling on a road;

determine, based on the first travel data, a first section on the road in which an average speed of the plurality of vehicles on the road is equal to or lower than a first threshold is present;

perform a first detection process of detecting the first section based on a first image captured by an in-vehicle camera of one of the plurality of vehicles in a vicinity of the first section;

determine inter-vehicle distances of the plurality of vehicles in the first section based on the first image;

determine an end portion of the first section in which an inter-vehicle distance between one of the plurality of vehicles in the first section and a vehicle ahead of the first section is equal to or greater than a predetermined value based on the first image;

determine whether the end portion of the first section is detected;

in response to a determination that the end portion of the first section is detected, determine, based on second travel data received from a plurality of vehicles located ahead of the first section, whether (1) an average speed of the plurality of vehicles located ahead of the first section is equal to or lower than a second threshold, and (2) an inter-vehicle distance between a vehicle at the end of the first section and a vehicle ahead of the end of the first section is equal to or smaller than a predetermined distance;

in response to a determination that (1) and (2) are satisfied, determine that a second section in which a congestion continuous with the first section is present;

perform a second detection process of detecting an end portion of the second section based on a second image captured by an in-vehicle camera mounted on a vehicle located in the second section; and present information indicating the congestion based on a position of the end portion of the first section or the end portion of the second section on a terminal associated with a user.

2. The information processing device according to claim 1, wherein the control unit is configured to determine that the second detection process is to be performed in a case where the road includes a plurality of lanes and a ratio of a number of vehicles present in at least one of the lanes to a number of vehicles present in another lane of the lanes is equal to or more than a third threshold value.

3. The information processing device according to claim 1, wherein in a case where it is determined that the second section is present, the control unit is further configured to perform a third detection process of detecting the end portion of the second section based on third travel data acquired from the vehicles located ahead of the first section in a case where a situation of the vehicles on the road is not suitable for detecting the end portion of the congestion using the image data, and perform the second detection process in a case where the situation of the vehicles on the road is suitable for detecting the end portion congestion using the image data.

4. The information processing device according to claim 1, wherein the control unit is further configured to acquire the travel data and the image data periodically from the plurality of vehicles.

5. The information processing device according to claim 1, wherein the control unit is further configured to acquire the travel data and the image data in response to a request received from the terminal associated with the user.

* * * * *